United States Patent
Slocum et al.

(10) Patent No.: US 11,148,947 B1
(45) Date of Patent: Oct. 19, 2021

(54) CONTROLLING HYDROGEN PRODUCTION FROM WATER-REACTIVE ALUMINUM

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 17/177,144

(22) Filed: Feb. 16, 2021

Related U.S. Application Data

(60) Provisional application No. 63/078,102, filed on Sep. 14, 2020, provisional application No. 63/063,406, (Continued)

(51) Int. Cl.
  *B01J 4/00* (2006.01)
  *B01J 7/02* (2006.01)
  (Continued)

(52) U.S. Cl.
  CPC ............. *C01B 3/08* (2013.01); *B01J 4/008* (2013.01); *B01J 7/02* (2013.01); *B01J 8/001* (2013.01);
  (Continued)

(58) Field of Classification Search
  None
  See application file for complete search history.

(56) References Cited

U.S. PATENT DOCUMENTS

| 3,204,320 A | 9/1965 | Eckstein et al. |
| 3,993,595 A | 11/1976 | Merkl |

(Continued)

FOREIGN PATENT DOCUMENTS

| JP | 2004174301 A | * | 6/2004 |
| JP | 2004243151 A | * | 9/2004 |

(Continued)

OTHER PUBLICATIONS

Machine translation for JP 2004-174301 A, retrieved on Apr. 6, 2021 from website, https://www.j-platpat.inpit.go.jp/p0200. (Year: 2021).*

(Continued)

*Primary Examiner* — Jennifer A Leung
(74) *Attorney, Agent, or Firm* — The Marbury Law Group, PLLC

(57) ABSTRACT

A system for controlling hydrogen production from water-reactive aluminum includes a regulator. For example, the regulator may include a plurality of discrete objects and a retainer. Each one of the discrete objects includes aluminum in an activated form reactable with water to produce hydrogen. The retainer may encase the plurality of discrete objects collectively in an elongate shape having an axial dimension greater than a radial dimension. Within the elongate shape, the plurality of discrete objects may define voids therebetween. The retainer may be permeable across its thickness such that water may enter the retainer to react with the activated form of aluminum of the discrete objects in a local concentration that promotes heat generation for rapid reaction while water about the retainer may globally cool the material in the retainer, with the combination promoting rapid and efficient reaction of aluminum to produce hydrogen.

17 Claims, 15 Drawing Sheets

Related U.S. Application Data filed on Aug. 9, 2020, provisional application No. 63/029,658, filed on May 25, 2020, provisional application No. 62/977,210, filed on Feb. 15, 2020.

(51) Int. Cl.
  *B01J 8/00* (2006.01)
  *B01J 19/00* (2006.01)
  *C01B 3/08* (2006.01)

(52) U.S. Cl.
  CPC .. *B01J 19/0006* (2013.01); *B01J 2208/00548* (2013.01); *B01J 2208/00814* (2013.01); *B01J 2208/00938* (2013.01); *B01J 2219/00164* (2013.01); *B01J 2219/302* (2013.01); *B01J 2219/312* (2013.01); *C01B 2203/02* (2013.01); *C01B 2203/1604* (2013.01); *C01B 2203/1647* (2013.01); *Y02E 60/36* (2013.01)

(56) References Cited

U.S. PATENT DOCUMENTS

| | | | |
|---|---|---|---|
| 4,358,291 | A | 11/1982 | Cuomo et al. |
| 4,770,848 | A | 9/1988 | Ghosh et al. |
| 5,620,652 | A | 4/1997 | Tack et al. |
| 6,648,272 | B1 | 11/2003 | Kothmann |
| 8,418,435 | B2 | 4/2013 | Hatoum |
| 8,974,765 | B2 * | 3/2015 | Boyle ................ C01B 3/08 423/658.2 |
| 10,745,789 | B2 | 8/2020 | Slocum |
| 2003/0024323 | A1 | 2/2003 | Wang et al. |
| 2003/0062444 | A1 | 4/2003 | Goodey |
| 2007/0057116 | A1 | 3/2007 | Sinsabaugh et al. |
| 2007/0217972 | A1 * | 9/2007 | Greenberg .......... C01B 3/08 422/232 |
| 2010/0028255 | A1 | 2/2010 | Hatoum |
| 2010/0112396 | A1 | 5/2010 | Goldstein |
| 2012/0052001 | A1 | 3/2012 | Woodall et al. |
| 2015/0258298 | A1 * | 9/2015 | Satoh ............. A61M 16/122 128/202.26 |
| 2016/0355918 | A1 | 12/2016 | Slocum |
| 2017/0022078 | A1 * | 1/2017 | Fukuoka ............. C01B 3/08 |
| 2019/0077510 | A1 | 3/2019 | Panas et al. |
| 2019/0341637 | A1 | 11/2019 | Fine et al. |
| 2020/0199728 | A1 | 6/2020 | Slocum |
| 2020/0262536 | A1 | 8/2020 | Deakin |

FOREIGN PATENT DOCUMENTS

| | | |
|---|---|---|
| WO | 2015005921 A1 | 1/2015 |
| WO | 20150077225 A1 | 5/2015 |
| WO | 2016196718 A1 | 12/2016 |
| WO | 2021034805 A1 | 2/2021 |

OTHER PUBLICATIONS

Machine translation for JP 2004-243151 A, retrieved on Apr. 6, 2021 from website, https://www.j-platpat.inpit.go.jp/p0200. (Year: 2021).*

"Can Dimensions—Twin Monkeys Beverage Canning Systems", https://twinmonkeys.net/can-dimensions/. Retrieved on Apr. 5, 2021. (Year: 2021).*

Metals Handbook Ienth Edition, "vol. 2, Properties and Selection: Nonferrous Alloys and Special-Purpose Materials", Oct. 1990, pp. 145-146.

Rajagopalan, Im et al., "Atomic-scale analysis of liquid-gallium embrittlement of aluminum grain boundaries", Acta Materialia, vol. 73 Jul. 2014, pp. 312-325.

Choi, Go et al., "Mechanism of Hydogen Generation via Water Reaction with Aluminum Alloys", Generating hydrogen on demand Jun. 28, 10, 4 pages.

Parmuzina, A.V et al., "Oxidation of activated aluminum with water as a method for hydrogen generation", Russian Chemical Bulletin, International Edition, vol. 58, No. 3 Mar. 2009 , pp. 493-989.

Vitos, L. et al., "The Surface Energy of Metals", Elsevier Surface Science 411,1998 , pp. 186-202.

"Fundamentals of Adhesion edited by Lieng-Huang Lee", Xerox Corporation, 1991 , pp. 333-336.

Ansara, I et al., "Thermodynamic Analysis of the Ga-ln, Al-GA, Al-ln and the Al-Ga-ln Systems", Calphad vol. 2, No. 3 1978 , pp. 187-196.

EPO, "EP Application Serial No. 16804381.8, Extended European Search Report dated Oct. 26, 2018", 7 pages.

WIPO, "PCT Application No. PCT/US16/35397, International Preliminary Report on Patentability dated Dec. 5, 2017", 11 pages.

ISA, "PCT Application No. PCT/US16/35397, International Search Report and Written Opinion dated Sep. 7, 2016", 13 pages.

USPTO, U.S. Appl. No. 17/014,593, Notice of Allowance and Fee(s) Due, dated Jun. 3, 2021, 15 pages.

USPTO, U.S. Appl. No. 17/014,593, Notice of Allowance and Fee(s) Due, dated Jan. 22, 2021, 19 pages.

USPTO, U.S. Appl. No. 17/014,593, Office Action—Restriction Requirement, dated Dec. 8, 2020, 7 pages.

USPTO, U.S. Appl. No. 16/804,676, Non-Final Office Action dated Jul. 21, 2021, 17 pages.

\* cited by examiner

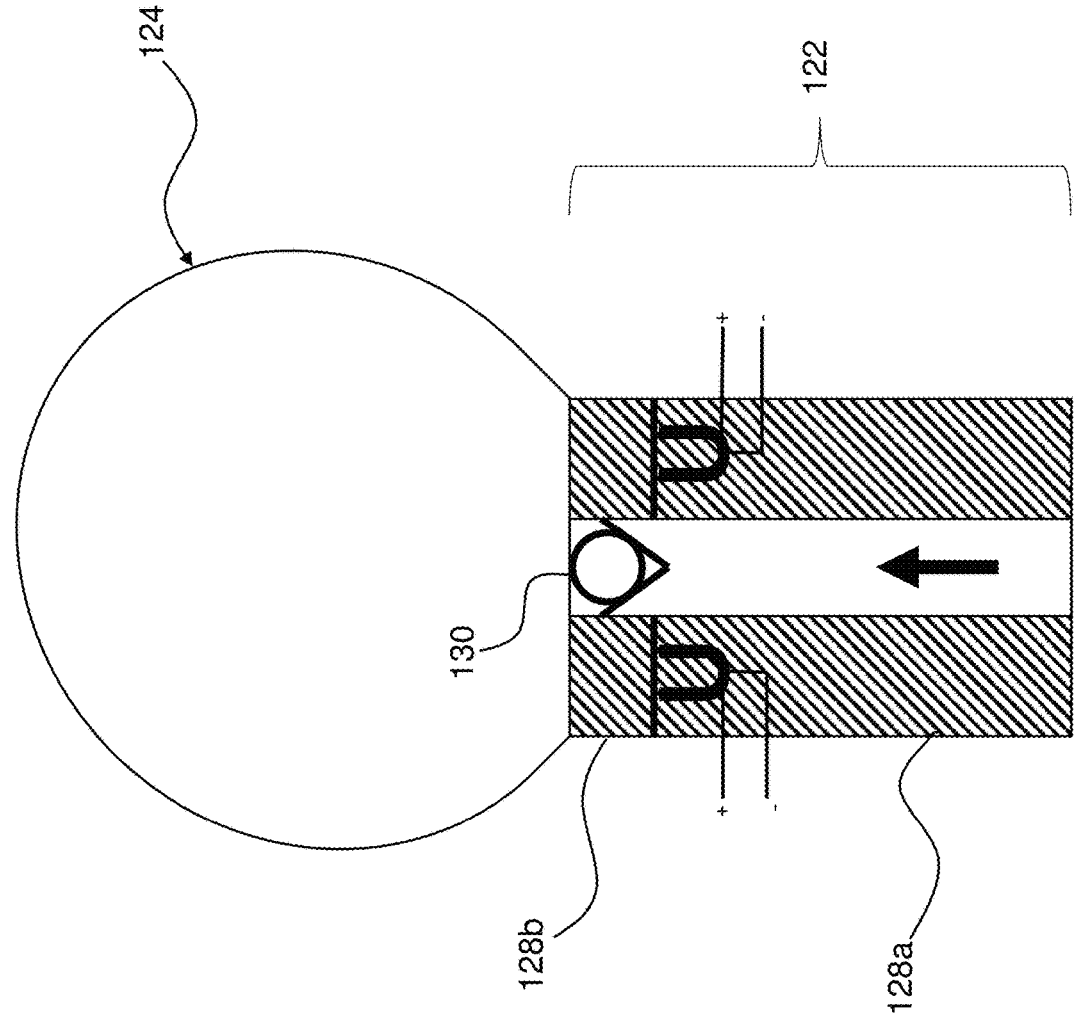

CONTROLLING HYDROGEN PRODUCTION FROM WATER-REACTIVE ALUMINUM

CROSS-REFERENCE TO RELATED APPLICATIONS

This application claims the benefit of priority to U.S. Provisional Patent Application No. 62/977,210, filed on Feb. 15, 2020, U.S. Provisional Patent Application No. 63/029,658, filed on May 25, 2020, U.S. Provisional Patent Application No. 63/063,406, filed on Aug. 9, 2020, and U.S. Provisional Patent Application No. 63/078,102, filed on Sep. 14, 2020, with the entire contents of each of these applications hereby incorporated herein by reference.

BACKGROUND

Under normal environmental conditions, aluminum is covered with a protective oxide coating. This stable oxide coating forms rapidly in air. Thus, although aluminum is reactive with water to produce hydrogen and heat, the oxide coating on aluminum is an obstacle to using aluminum as a source of energy. To overcome the impact of aluminum oxide on the water-reactivity of aluminum, aluminum can be treated to be in an activated form that yields hydrogen and heat when reacted with water.

Activated aluminum is generally robust and easy to handle, making it a useful source of hydrogen across a range of conditions. However, reacting a large amount of activated aluminum with water—such as may be required for rapidly producing a correspondingly large quantity of hydrogen—presents certain challenges. In particular, the reaction of activated aluminum and water is highly exothermic. Thus, if too little water is present, the reaction with activated aluminum can boil off the water before the water can fully react with the activated aluminum. Further, in some cases, the resulting steam may expand violently with force sufficient to damage the reaction chamber. To the extent resulting steam can recondense in the reaction chamber to reintroduce water into contact with the activated aluminum, this can add significantly to the time required to produce hydrogen. Conversely, if too much water is present, the reaction of water and activated aluminum may lack enough heat for the reaction to proceed efficiently, thus adding significantly to the time required to produce hydrogen.

Accordingly, there remains a need to control hydrogen production from water-reactive aluminum to facilitate rapid delivery of large amounts of hydrogen while controlling steam produced, as may be useful in many field applications.

SUMMARY

According to one aspect, a regulator for controlling hydrogen production from water-reactive aluminum may include a plurality of discrete objects, each one of the discrete objects including aluminum in an activated form reactable with water to produce hydrogen, and a retainer encasing the plurality of discrete objects collectively in an elongate shape having an axial dimension greater than a diametric dimension, the retainer permeable across its thickness and, within the elongate shape, the plurality of discrete objects defining voids therebetween.

In certain implementations, a ratio of the axial dimension to the diametric dimension of the elongate shape collectively formed by the plurality of discrete objects may be greater than about 3:1 and less than about 100:1.

In some implementations, an average minimum dimension of the plurality of discrete objects is greater than about one-tenth of the diametric dimension of the elongate shape collectively formed by the plurality of discrete objects.

In certain implementations, a packing density of the plurality of discrete objects along the elongate shape is greater than about 0.5 g/cm$^3$ and less than about 2.6 g/cm$^3$.

In some implementations, the retainer may be expandable in response to pressure in the retainer, with expansion of the retainer increasing permeability of the retainer. For example, the retainer is at least partially formed of one or more polymers. Additionally, or alternatively, the retainer is at least partially formed of one or more metals. Additionally, or alternatively, the one or more metals include aluminum, magnesium, or iron.

In certain implementations, the plurality of discrete objects may be encased in the retainer in layers with material of the retainer extending between adjacent layers of the plurality of discrete objects.

In some implementations, along the elongate shape, the retainer may have a diametric dimension of greater than zero and less than about 1.625 inches.

In certain implementations, a tube may extend through the plurality of discrete objects encased in the retainer. For example, the tube may be in fluid communication with an environment outside of the retainer, and the tube may define a plurality of pores through which water is flowable into contact with a portion of the plurality of discrete objects adjacent to the tube.

In some implementations, the regulator may further include a cord attached to the retainer.

According to another aspect, a system for controlling hydrogen production from water-reactive aluminum may include a reaction vessel including walls defining a primary volume and a regulator disposed in the primary volume, the regulator including a retainer defining a secondary volume having an elongate shape with an axial dimension greater than a diametric dimension, the secondary volume spaced from the walls of the reaction vessel, the secondary volume in thermal communication with the primary volume, the retainer having greater than about 20 openings per linear inch and less than about 60 openings per linear inch, and the secondary volume of the retainer having a diametric dimension greater than zero and less than about 1.625 inches.

In certain implementations, the primary volume may be greater than the secondary volume.

In some implementations, the retainer may be disposed on at least one of the walls of the reaction vessel, and the secondary volume is spaced from the least one of the walls of the reaction vessel by material thickness of the retainer.

In certain implementations, the retainer may be supported in the primary volume away from each of the walls defining the primary volume.

In some implementations, the reaction vessel may define one or more openings, and the retainer is removable from the reaction vessel through the one or more openings.

In certain implementations, the system may further include a plurality of discrete objects in the secondary volume of the retainer, each one of the discrete objects including aluminum in an activated form reactable with water to produce hydrogen.

In some implementations, the system may further include a balloon and a valve assembly, the balloon in fluid communication with the primary volume via the valve assembly, the valve assembly including a quick-connect valve and a check valve, the quick-connect valve including a first portion coupled to the reaction vessel and a second portion coupled to the balloon, the quick-connect valve electrically actuatable to release the first portion from the second portion, and the check valve disposed in the balloon and operable to float to an open position under the force of condensation in the balloon to release at least a portion of the condensation from the balloon while retaining lifting gas within the balloon.

According to yet another aspect, a method of controlling hydrogen production from water-reactive aluminum may include immersing a retainer in water held in a primary volume, the retainer defining a secondary volume having an elongate shape and containing a plurality of discrete objects including an activated form of aluminum, moving a portion of the water from the primary volume into the secondary volume via permeability of the retainer, along the elongate shape of the secondary volume, reacting the portion of the water with the activated form of aluminum to form hydrogen and heat; and flowing heat and hydrogen from the secondary volume into a remaining portion of the water in the primary volume.

In some implementations, a mass ratio of the portion of the water to the activated form of aluminum in the secondary volume is 2:1 along at least a portion of the secondary volume at initiation of the reaction of the water and activated aluminum in the secondary volume.

BRIEF DESCRIPTION OF THE FIGURES

FIG. 1B is a schematic representation of the coupling between the outlet and the balloon of the system of FIG. 1A, with the coupling between the outlet and the balloon shown in cross-section.

Like reference symbols in the various drawings indicate like elements.

DETAILED DESCRIPTION

Figure 1A:
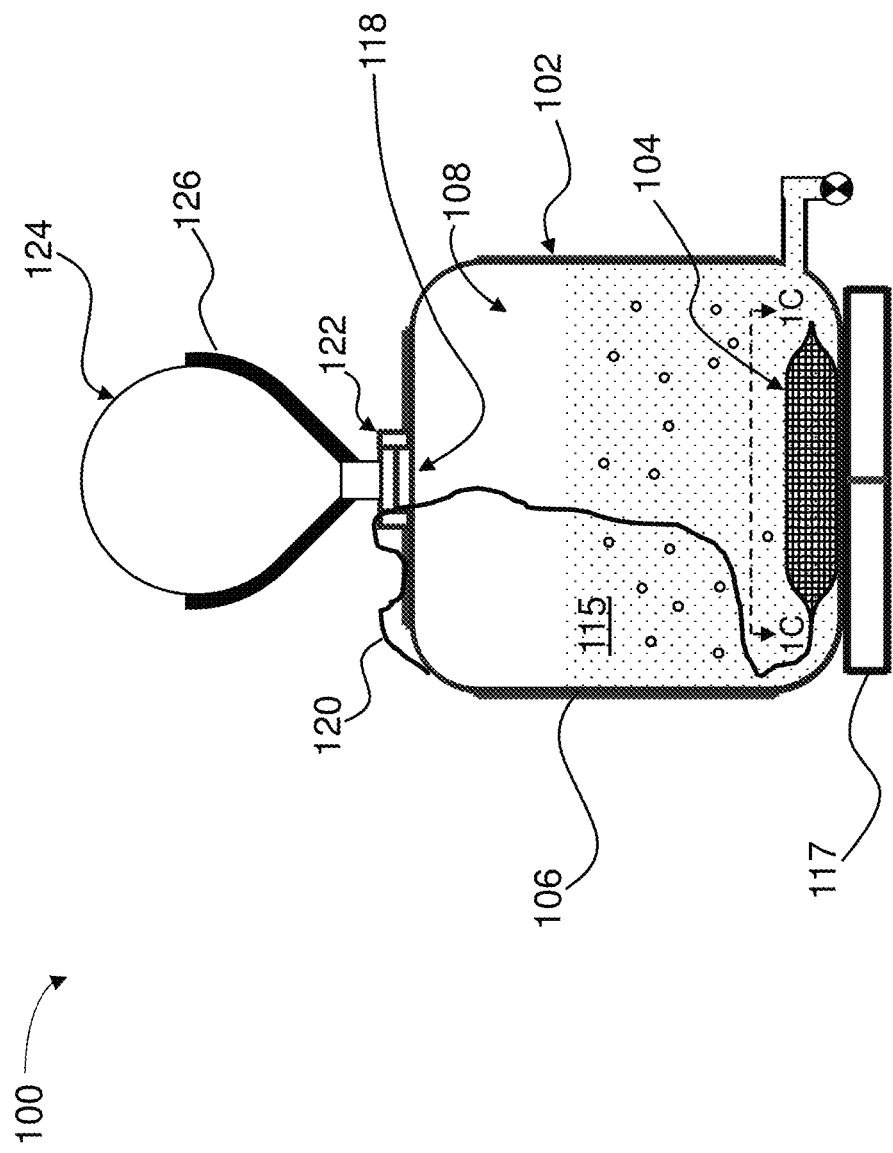
FIG. 1A is a schematic representation of a system including a reaction vessel having an outlet shown coupled to a balloon, the reaction vessel shown in cross-section with a retainer disposed in a primary volume defined by the reaction vessel.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Using activated aluminum as a source of hydrogen can present challenges in field applications in which it is necessary or desirable to form large quantities of hydrogen rapidly. For example, in many field applications, it may be difficult to control the ratio of water to activated aluminum between extremes that can slow the rate of hydrogen production and/or result in incomplete reaction of the activated aluminum. Accordingly, in the description that follows, various aspects of rapidly reacting large amounts of activated aluminum are described. For example, the devices, systems, and methods described herein may facilitate balancing aspects one or more of local heat generation, global heat dissipation, or mass transport to achieve a reaction of activated aluminum that achieves a balance between rapidly forming hydrogen while reacting the activated aluminum to completion (e.g., with a low likelihood of self-extinguishing by boiling off all of the water prematurely and/or a low likelihood of forming high-pressure steam that can damage components) to form a large quantity of hydrogen.

As used herein, the terms "activated aluminum," "aluminum in an activated form," and "water-reactive material" shall be understood to be interchangeable with one another, unless otherwise specified or made clear from the context, with the different terms being used as appropriate to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

As used herein, the term "stoichiometric ratio" shall be understood to refer to a ratio of water to activated aluminum in which the amount of water present is sufficient to react to completion with the activated aluminum to consume all of the activated aluminum with no excess water left over. For water and raw aluminum, this ratio is 2:1 water-to-raw aluminum by mass. However, given the instability of raw aluminum, the aluminum used herein is activated aluminum containing a small amount (e.g., less than about 3 percent by mass) of a eutectic alloy. Given that the activated aluminum described herein contain contains only a small amount of the eutectic alloy (which remains unreacted), the theoretical ratio of 2:1 for water-to-raw aluminum is nevertheless useful as an approximation of the stoichiometric ratio of water-to-activated aluminum by mass and is used herein unless otherwise specified or made clear from the context. Further, ratios of water-to-activated aluminum expressed herein may refer to a local ratio within at least a portion of a secondary volume or an overall ratio within a reaction vessel, and it shall be understood that the context shall dictate whether a particular ratio is a local ratio or an overall ratio.

Figure 1C:
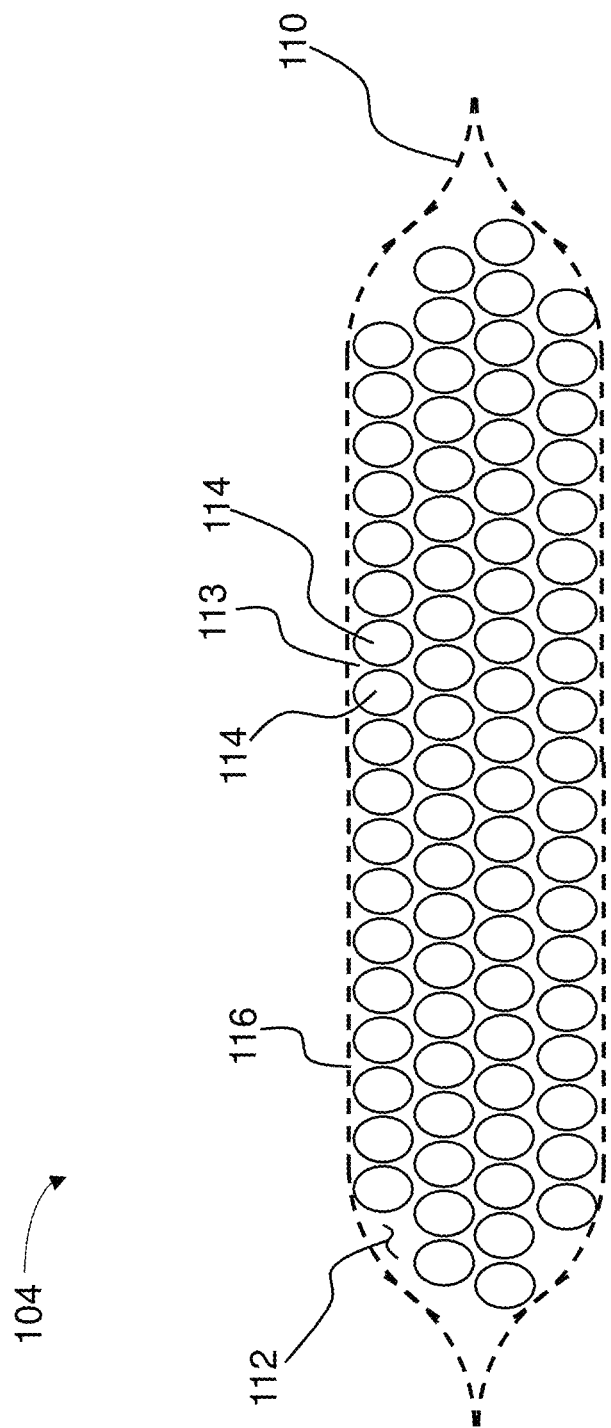
FIG. 1C is a side cross-sectional view of the retainer shown disposed in the primary volume of the reaction vessel in FIG. 1A, the cross-section taken along the line 1C-1C in FIG. 1A.
Figure 1D:
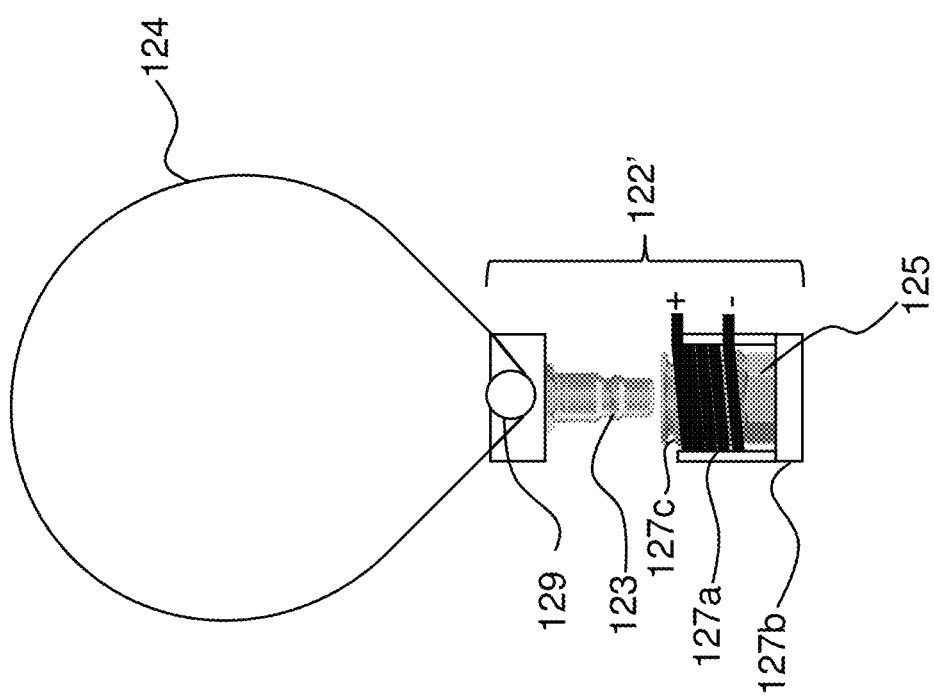
FIG. 1D is a schematic representation of another coupling between the outlet and the balloon of the system of FIG. 1A.

Referring now to FIGS. 1A-1C, a system 100 for controlling hydrogen production from water-reactive aluminum may include a reaction vessel 102 and a regulator 104. The reaction vessel 102 may include walls 106 defining a primary volume 108. The regulator 104 may include a retainer 110 permeable along its thickness and defining a secondary volume 112 having an elongate shape with an axial dimension greater than a diametric dimension. In certain implementations, the regulator 104 may further include a plurality of discrete objects 114 disposed in the secondary volume 112 of the retainer 110, and each one of the plurality of discrete objects 114 may include aluminum in an activated form reactable with water to produce hydrogen.

The plurality of discrete objects 114 may be encased in the retainer 110 such that the overall shape of the plurality of discrete objects 114 closely matches the elongate shape of the secondary volume 112, with allowances for deviations associated with voids 113 between the plurality of discrete objects 114. That is, with the plurality of discrete objects 114 encased in the retainer 110, the regulator 104 may have a sausage-like shape. This shape is characterized by a two-dimensional exchange boundary between the retainer 110 and the plurality of discrete objects 114 in the secondary volume 112, given that mass and heat transfer properties along the length of the sausage-like shape do not vary significantly and the ends of the elongate shape of the secondary volume 112 have little to no impact on mass transfer and thermal conduction between the primary volume 108 and the secondary volume 112. As compared to a sphere or another shape characterized by a three-dimensional exchange boundary with material contained therein, the two-dimensional exchange boundary of the retainer 110 along the secondary volume 112 offers significant advantages with respect to scaling. For example, an additional amount of the plurality of discrete objects 114 including water-reactive aluminum may be added to the regulator 104 by increasing the length of the retainer 110 while holding the diametric dimension and permeability of the retainer 110 constant such that mass and heat transfer properties remain consistent along the axial dimension of the retainer 110. The result is more predictable scaling in hydrogen generation performance, as compared to a shape in which the physics of mass and heat transfer change with changing volume of the shape.

As described in greater detail below, the regulator 104 may be positioned in the primary volume 108 of the reaction vessel 102 such that water 115 in the primary volume 108 may flow into the secondary volume 112 via the permeability of the retainer 110. As also described in greater detail below, the permeability of the retainer 110 along the elongate shape of the secondary volume 112 may facilitate initially retaining a local concentration of water-to-activated aluminum in the secondary volume 112 to produce enough heat for the chemical kinetics of the reaction to proceed rapidly in the secondary volume 112 while also facilitating flowing reaction byproducts and excess heat away from the reaction and into an excess amount of the water 115 in the primary volume 108 to reduce the likelihood of prematurely stifling the reaction with the reaction byproducts and/or by burning off all of the water in the vicinity of the activated aluminum. This self-regulating balance afforded by the retainer 110 may facilitate rapid generation of large amounts of hydrogen from the activated aluminum of the plurality of discrete objects 114 in the secondary volume 112. Thus, as compared to the use of disaggregated pieces of water-reactive aluminum or water-reactive aluminum aggregated in other shapes, the permeability of the elongate shape of the secondary volume 112 may provide a degree of control useful for consistently and reliably meeting hydrogen production requirements of demanding field applications with little or no specialized training of personnel.

In general, the reaction vessel 102 may be sized such that the primary volume 108 is greater than the secondary volume 112 defined by the retainer 110 of the regulator 104 positionable in the primary volume 108. For example, the primary volume 108 may be sized to contain a quantity of the water 115 suitable for both reaction and cooling according to the various different techniques described herein. More specifically, a portion of the water 115 in the primary volume 108 may flow into the secondary volume 112 to form a stoichiometric concentration of water and activated aluminum locally within at least a portion of the secondary volume 112 to generate heat promoting a faster reaction rate. The remainder of the water 115 in the primary volume 108 surrounding the regulator 104 may cool the retainer 110 to dissipate some of the heat from the reaction in the secondary volume 112 to decrease the likelihood of dangerous conditions (e.g., steam explosion) associated with excessive heating, but not enough heat to cause the activated aluminum of the discrete objects 114 in the secondary volume 112 to react inefficiently. In certain implementations, a ratio of water-toactivated aluminum on a mass basis may be 7:1, which is enough water to turn all of the heat into steam. In instances in which minimal steam is desired or necessary, however, the ratio of water-to-activated aluminum may be 40:1.

While the reaction vessel 102 may be any one or more of various different types of containers, it shall be appreciated that the reaction vessel 102 may advantageously include any one or more standardized containers having reinforcement and water-tight seals. Because these containers are standardized and used across many other applications, such containers may be low-cost and readily sourced. As a specific example, the reaction vessel 102 may include a water-cube, which is often called a "tote" and can hold up to 1000 liters of liquid. With such capacity, the water-cube may react 12.5 kg of activated aluminum with about 500 liters of water to generate about 14 cubic meters of hydrogen, at standard temperature and pressure, while having a sufficient safety margin to expand to accommodate the reaction products. Continuing with this example, the minimum mass of the water 115 required to react 12.5 kg of activated aluminum of the discrete objects 114 is approximately 24 kg. However, an excess amount of the water 115 may be provided to absorb the heat generated from the reaction so that the portion of the water 115 in the secondary volume 112 is not boiled off before it can react with the activated aluminum in the secondary volume 112. Given that water-cubes may be reinforced with metal, the water-cube may be able to resist deformation under low gas pressure. Further or instead, water-cubes have a form factor amenable to being transported on a pallet 117, which may be particularly useful for moving the system 100 using a forklift or other similar machinery for installation at a point of use. Other examples of standardized and low-cost containers that may be used as the reaction vessel 102 include, but are not limited to, oil drums, covered buckets, or other industrial-sized containers including flexible bags storable in small volume until needed.

In general, the retainer 110 may be formed of any one or more of various different types of materials useful for imparting predetermined properties to the retainer 110. Such predetermined properties may relate to reducing the likelihood of failure modes with the potential to interfere with reusability of the reaction vessel 102 in the field. Additionally, or alternatively, predetermined properties of the retainer 110 may be useful for facilitating efficient reaction of water with activated aluminum of the discrete objects 114 to form hydrogen and steam, both of which are lifting gases.

As an example, the retainer 110 may be at least partially formed of one or more polymers to facilitate protecting the walls 106 of the reaction vessel 102 from thermal damage. Additionally, or alternatively, forming at least a portion of the retainer 110 of one or more polymers may reduce the likelihood that rupture or other structural failure of the retainer 110 will produce sharp edges having the potential to puncture the walls 106.

As another example, the retainer 110 may be at least partially formed of one or more of various different having chemical properties useful for promoting efficient reaction of the activated aluminum and water in the secondary volume 112. For example, the retainer may be at least partially formed of one or more metals (aluminum, magnesium, iron, or a combination thereof) useful for reacting activated aluminum with the water 115 in the presence of ions (e.g., chlorine). Such reactability afforded by the one or more metals may be significant in field applications in which special preparation of the water 115 is impractical or impossible.

As yet another example, the retainer 110 may be at least partially formed of one or more of various different materials (e.g., one or more of a polymer or a metal) useful for imparting a predetermined expansion profile to the retainer 110 in response to an increase in pressure in the secondary volume 112. The permeability of the retainer 110 may increase as the retainer 110 expands in response to pressure such that the predetermined expansion profile of the retainer 110 may facilitate flowing reaction byproducts (e.g., aluminum hydroxide) out of the secondary volume 112 to reduce the likelihood that excessive amounts of aluminum hydroxide in the secondary volume 112 may choke the reaction of activated aluminum and water in the secondary volume 112. As an example of a predetermined expansion profile, the retainer 110 may be initially stiff in an orientation of the retainer 110 encased about the discrete objects 114 to facilitate retaining heat in the secondary volume 112 to promote progression of the reaction of water-reactive aluminum to produce hydrogen. Following stiffness through an initial expansion, the retainer 110 may be relatively more flexible to expand more easily as the reaction of the water-reactive aluminum in the secondary volume 112 progresses and the formation of reaction byproducts becomes significant. The foregoing example is one of many possible predetermined expansion profiles achievable using a combination of materials, permeability, and/or hole shapes. More generally, it shall be understood that the retainer 110 may be formed with a predetermined expansion profile useful for self-regulation of the reaction of the activated aluminum of the discrete objects 114 in the secondary volume 112 to facilitate efficiently forming a large quantity of hydrogen.

The permeability through the thickness of the retainer 110 may include any manner and form of porosity useful for achieving mass and heat transfer between the primary volume 108 and the secondary volume 112 with a low likelihood of prematurely quenching the reaction or generating excessive heat in the secondary volume 112. That is, as the retainer 110 expands, the permeability of the retainer 110 may increase to accommodate an increased rate of heat and/or mass transfer between the primary volume 108 and the secondary volume 112. While this may include a range of permeability of the retainer 110, it shall be appreciated this range is nevertheless bounded. For example, the aluminum hydroxide byproduct of the reaction of water-reactive aluminum is a gelatinous material having a small particle size amenable to suspension in water. If the orifices 116 defined by the retainer 110 are too small, the aluminum hydroxide byproduct may not be able to move out of the secondary volume 112 at a rate fast enough to reduce the likelihood of choking the reaction in the secondary volume. However, if the orifices 116 defined by the retainer 110 are too large, the activated aluminum of the discrete objects 114 may fall out of the orifices 116 and into the primary volume 108, where the reaction of the activated aluminum may become excessively cooled. As described in greater detail below with respect to the experimental results presented herein, between these extremes, the reaction rate of the activated aluminum is sensitive to the size of the orifices 116—and, thus, the permeability—of the retainer 110 through its thickness.

While various aspects of the retainer 110 have been described in the context of promoting the efficient reaction of the water 115 and the activated aluminum of the plurality of discrete objects 114 in the secondary volume 112 to produce hydrogen, it shall be appreciated that the arrangement of the plurality of discrete objects 114 within the secondary volume 112 may additionally or alternatively facilitate achieving a localized environment, within the secondary volume 112, to promote efficient hydrogen formation. For example, stacking many instances of the plurality of discrete objects 114 on top of one another may limit penetration of the water 115 into the plurality of discrete objects 114 and, in turn, may lead to the creation of high temperature steam with the potential for an explosion forceful enough to damage the reaction vessel 102. More specifically, it has been experimentally determined that it is generally undesirable to stack more than ten instances of the plurality of discrete objects 114 across the diametric dimension of the elongate shape of the secondary volume 112. Thus, stated differently, an average minimum dimension of the plurality of discrete objects 114 may be greater than about one-tend of the diametric dimension of the elongate shape in which the plurality of discrete objects 114 are held.

Additionally, or alternatively, it shall be understood that the reaction rate of the water 115 and the activated aluminum of the plurality of discrete objects 114 may be a function of the packing density of the plurality of discrete objects 114 in the secondary volume 112 of the retainer 110. In this context, the packing density of the plurality of discrete objects 114 may be regarded as a proxy for the ability of the water 115 penetrate the plurality of discrete objects 114 initially. For example, the plurality of discrete objects 114 may have a packing density along the elongate shape of the secondary volume 112 of greater than about 0.5 g/cm$^3$ and less than about 2.6 g/cm$^3$. At the lower end of this range, the water 115 may readily penetrate a significant portion of the plurality of discrete objects 114. At the higher end of this range, the water 115 may react locally to cause spallation of the plurality of discrete objects 114 and expose additional area of activated aluminum for reaction. From the foregoing, it shall be appreciated that the packing density may be selected alone, or in combination with any one or more other factors described herein, to achieve a reaction rate useful for efficient reaction of activated aluminum to form hydrogen.

In general, the regulator 104 may be positionable in the primary volume 108 in any one or more of various different positions and/or orientations as may be useful for moving the water 115 from the primary volume 108 of the reaction vessel 102 into the secondary volume 112 of the retainer 110 while facilitating flowing heat and one or more reaction byproducts away from the secondary volume 112 to the primary volume 108. For example, the retainer 110 may be disposed on at least one of the walls 106 of the reaction vessel 102. As a more specific example, the retainer 10 may be disposed at the bottom of the reaction vessel 102 under the force of the weight of the regulator 104 laden with the discrete objects 114. Such an orientation along a lower portion of the reaction vessel 102 may be useful for, among other things, facilitating a natural convection flow of the water 115 to carry heat away from the regulator 104 as the activated aluminum of the discrete objects 114 reacts with water in the secondary volume 112. With the retainer 110 disposed along the bottom of the reaction vessel 102, it shall be appreciated that the secondary volume 112 may be spaced from the walls 106 of the reaction vessel 102 by at least the material thickness of the retainer 110. By supporting the secondary volume 112 away from the walls 106 of the reaction vessel 102, the retainer 110 may reduce the likelihood of hot materials coming into direct contact with and damaging the walls 106. As described in greater detail below, the reaction vessel 102 may include one or more structural features upon which the retainer 110 may be positioned to provide additional spacing between the walls 106 and the secondary volume 112 as the exothermic reaction of water and activated aluminum proceeds.

In certain implementations, the regulator 104 may be sized for introduction and retrieval from the water 115 of the primary volume 108 while the water 115 remains in the primary volume 108. That is, the regulator 104 laden with the discrete objects 114 in the retainer 110 may be introduced into the water 115 of the primary volume 108 for reaction according to the various different techniques described herein. Once reacted, the regulator 104 laden with reaction byproducts in the retainer 110 may be retrieved from the water 115 of the primary volume 108. Such introduction and retrieval of multiple instances of the regulator 104 into and from the water 115 may be repeated as necessary to produce a quantity of hydrogen necessary or desirable for a given application. In field applications, the ability to use the water 115 in the primary volume 108 to react with activated aluminum held in multiple instances of the regulator 104 may have significant logistical advantages, particularly where water is scarce.

As an example, the reaction vessel 102 may define an opening 118 through which the retainer 110 may be moved into and out of the primary volume 108 of the reaction vessel 102. The opening 118 may advantageously be disposed along a top portion of the reaction vessel 102 such that the opening 118 is above a level of the water 115 in the primary volume 1108. In some instances, the regulator 104 may include a cord 120 attached to the retainer 110. In use, the cord 120 may be sized to extend out of the primary volume 108 via the opening 118 and, with the opening clear, a user may use the cord 120 to lower and raise the regulator 104 into and out of the primary volume 108 as necessary.

While the opening 118 may be dedicated for the introduction and retrieval of the regulator 104 in some cases, it shall be appreciated that the opening 118 may advantageously serve another purpose to reduce the number of potential leak sites from the reaction vessel 102. In certain implementations, the system 100 may include a valve assembly 122 coupled to the opening 118 to control the flow of hydrogen from the primary volume 108 to a receptacle in which the hydrogen may be stored and/or used. For example, the system 100 may include a balloon 124 in fluid communication with the primary volume 108 via the valve assembly 122. As a more specific example, the system 100 may include a shroud 126 disposed about at least a portion of the balloon 124 to reduce the likelihood of damaging the balloon 124 when the balloon 124 is connected to the valve assembly 122 under windy conditions. While a balloon 124 is shown, it shall be appreciated that this is for the sake of clear and efficient illustration and, unless otherwise specified or made clear from the context, the receptable may be any one or more of various different devices and/or storage vessels compatible with hydrogen.

In certain implementations, the valve assembly 122 may be electrically actuatable, as may be useful for remote actuation by a user standing at a safe distance away from the system 100 as hydrogen is moved from the primary volume 108 into the balloon 124 via the valve assembly 122. As an example, the valve assembly 122 may hold the balloon 124 to the reaction vessel 102 through the use of magnetic force. As a more specific example, the valve assembly 122 may include a first magnet portion 128a and a second magnet portion 128b. The first magnet portion 128a may be disposed on the reaction vessel 102, and the second magnet portion 128b may be disposed on the balloon 124. The first magnet portion 128a and the second magnet portion 128b may remain magnetically coupled to one another in the absence of an electric current. To release the balloon 124 from the reaction vessel 102, an electric current may be applied (e.g., from a user standing away from the system 100) to the first magnet portion 128*a* to interrupt the magnetic force between the first magnet portion 128*a* and the second magnet portion 128*b*. While the coupling between the balloon 124 and the reaction vessel 102 has been described as being carried out using magnetic force, it shall be appreciated that any one or more of various different other types of coupling may be additionally or alternatively used. By way of example, and not limitation the valve assembly 122 may additionally or alternatively include a sanitary coupling held together by a pin.

In certain implementations, the valve assembly 122 may additionally, or alternatively, include a check valve 130. For example, the check valve 130 may be coupled to the balloon 124 or inside the balloon in the form of a ball. In use, the check valve 130 may move open under pressure of hydrogen moving from the primary volume 108 into the balloon 124, and the check valve 130 may close to reduce the likelihood of hydrogen in the balloon 124 escaping back into the primary volume 108.

While the valve assembly 122 has been described as holding the balloon 124 to the reaction vessel 102, it shall be understood that other types of valves may be used to hold the balloon 124 to the reaction vessel 102. For example, referring now to FIGS. 1A-1D, a valve assembly 122' may be used in addition to or instead of the valve assembly 122 (FIG. 1B) to hold the balloon 124 to the reaction vessel 102 a ball-type quick connect valve including a male portion 123 and a female portion 125. The male portion 123 may be coupled to the balloon 124, and the female portion 125 may be coupled to the reaction vessel 102. A solenoid coil 127*a* inside of a solenoid body 127*b* may be coupled to the female portion 125 of the ball-type quick connect. Actuation of the solenoid coil 127*a* may pull a sliding element 127*c* in a direction away from the male portion 123 to disconnect the male portion 123 from the female portion 125 of the valve assembly 122'. In certain implementations, the valve assembly 122' may include a check valve 129 movable to reduce the likelihood of a lifting gas (e.g., hydrogen gas) escaping from the balloon 124 when the male portion 123 and the female portion 125 of the valve assembly 122' are disconnected from one another.

While hydrogen in the primary volume 108 may pass into the balloon 124 as the hydrogen is produced in some instances, it shall be appreciated that other modes of moving hydrogen from the primary volume 108 into the balloon 124 are additionally, or alternatively, possible. For example, in some cases, the reaction vessel 102 may be a high-pressure vessel. Continuing with this example, a stoichiometric amount of the water 115 and the activated aluminum of the plurality of the discrete objects 114 may be combined in the reaction vessel 102. The reaction vessel 102 may self-compress and come to equilibrium. Once the reaction has been completed in the reaction vessel 102, the valve assembly 122 may be actuated (e.g., by actuating the check valve 130) to direct the hydrogen to the balloon 124, with the resulting expansion of hydrogen cooling the hydrogen as it moves into the balloon 124.

Figure 2:
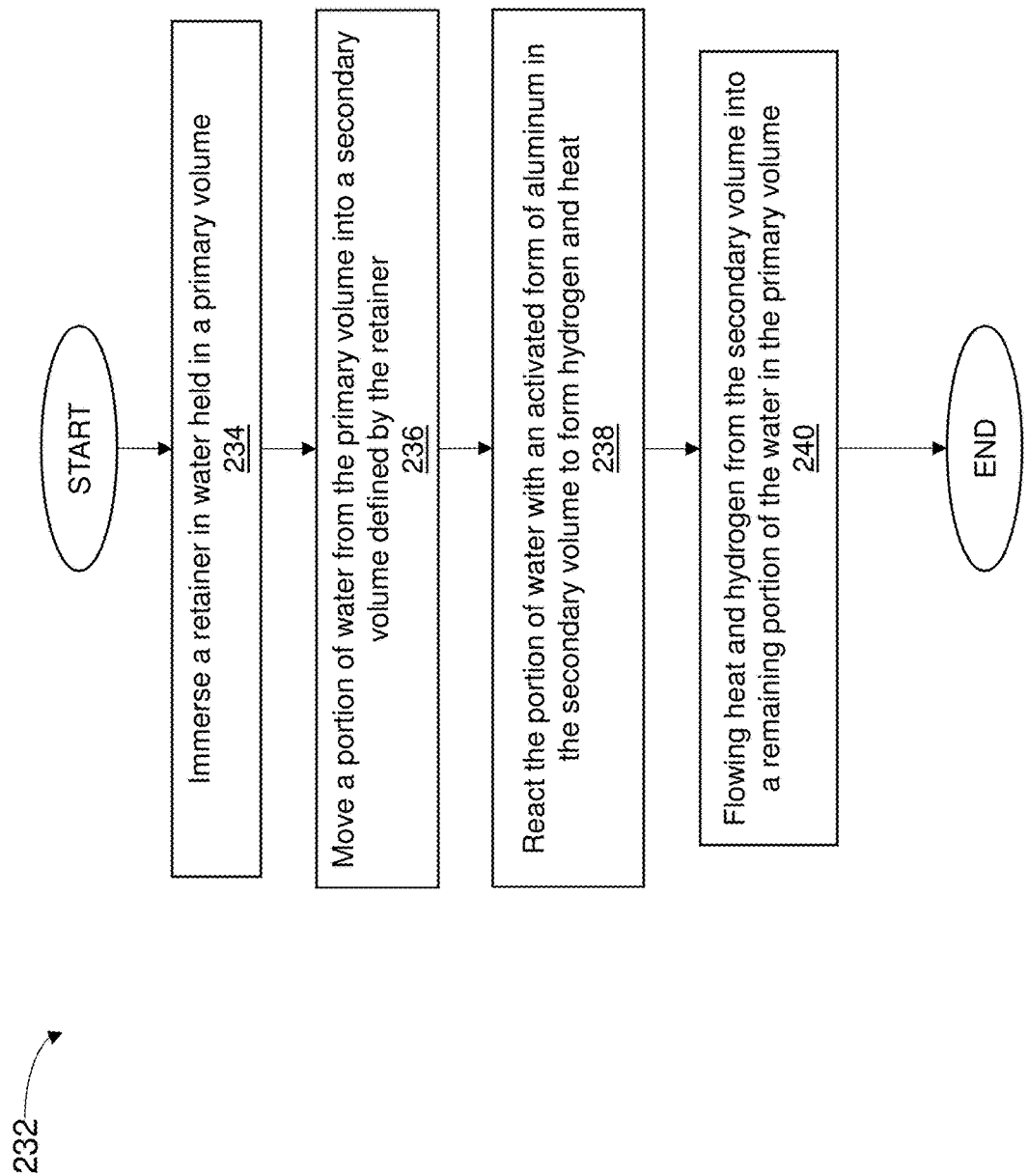
FIG. 2 is a flowchart of an exemplary method of controlling hydrogen production from water-reactive aluminum.

FIG. 2 is a flowchart of an exemplary method 232 of controlling hydrogen production from water-reactive aluminum. Unless otherwise specified or made clear from the context, it shall be appreciated that the exemplary method 232 may be carried out using any one or more of various different devices and systems described herein. Thus, for example, the exemplary method 232 may be carried out using the system 100 (FIG. 1A), unless a contrary indication of provided.

As shown in step 234, the exemplary method 232 may include immersing a retainer in water held in a primary volume. The retainer may be, for example, the retainer 110 (FIG. 1A) and, therefore, may define a secondary volume having an elongate shape. Additionally, or alternatively, a plurality of discrete objects including an activated form of aluminum may be contained in the secondary volume of the retainer. For example, the retainer may encase the plurality of discrete objects such that the plurality of discrete objects have a shape approximating the secondary volume.

As shown in step 236, the exemplary method 232 may include moving a portion of the water from the primary volume into the secondary volume via permeability of the retainer. For example, moving a portion of the water from the primary volume into the secondary volume may include moving water into the secondary volume along an axial dimension and circumferential dimension of the secondary volume such that water may be introduced into voids in the secondary volume at multiple locations along the elongate shape of the discrete objects in the secondary volume.

As shown in step 238, the exemplary method 232 may include along the elongate shape of the secondary volume, reacting the portion of the water with the activated form of aluminum to form hydrogen and heat. For example, initially, the ratio of water to the activated aluminum in the secondary volume may be stoichiometric (2:1 by mass of water to activated aluminum) in at least a portion of the secondary volume. In turn, such a local stoichiometric ratio may facilitate rapid reaction of water and activated aluminum to produce hydrogen and—importantly for early stages of the reaction—heat. Such early heat generation may facilitate achieving an overall temperature rise in the secondary volume to increase chemical kinetics of the reaction of water and activated aluminum to produce hydrogen.

As shown in step 240, the exemplary method 322 may include flowing heat and hydrogen from the secondary volume into a remaining portion of the water in the primary volume. That is, the excess water remaining the primary volume may provide cooling to the secondary volume and, in doing so, may control the reaction rate and, thus, heat generation rate in the secondary volume. Though appropriate sizing the primary volume relative to the secondary volume, the degree of cooling provided by the excess water in the primary volume may be sufficient to reduce the likelihood of excessive heating in the secondary volume while reducing the likelihood of prematurely quenching the reaction in the secondary volume. Thus, taken together, the balance provided by generating heat rapidly in the secondary volume and providing an appropriate measure of cooling the primary volume may facilitate rapid production of large amounts of hydrogen, as may be useful in many field applications, where the need for hydrogen may be unpredictable.

The following experiments describe controlling hydrogen production using various different implementations of the regulator 104 (FIG. 1A). It is to be understood that these experiments are corresponding results are set forth by way of example only, and nothing in these examples shall be construed as a limitation on the overall scope of this disclosure.

Nine different regulators were constructed. Each regulator included a retainer encasing a plurality of discrete objects in an elongate shape. Each retainer was permeable through its thickness along the elongate shape of the plurality of discrete objects, and each discrete object included activated aluminum. The nine different regulators included variations in overall diametric dimension of the secondary volume defined by the retainer, variations in permeability via variations in mesh density, and variations in mesh shape. Each of these nine different regulators and a control sample (no regulator), were individually exposed to water in an overall ratio of 40:1 by mass of water-to-activated aluminum and a thermocouple was used to measure temperature of the water in which the hydrogen-generating reaction was taking place. The features of the nine different regulators and the control sample tested are listed in Table 1 below.

TABLE 1

Regulator Characteristics for Tests Carried Out at 40:1 Water-to-Activated Aluminum ratio.

| Identifier | Diametric Dimension of Elongate Shape (inches) | Permeability (Mesh | Mesh Shape Size) | Mesh Material |
|---|---|---|---|---|
| Regulator 1 | 0.5 | 40 × 40 | Orthogonal | Steel |
| Regulator 2 | 1 | 40 × 40 | Orthogonal | Steel |
| Regulator 3 | 1.375 | 40 × 40 | Orthogonal | Steel |
| Regulator 4 | 1.625 | 40 × 40 | Orthogonal | Steel |
| Regulator 5 | 2 | 40 × 40 | Orthogonal | Steel |
| Regulator 6 | 1.375 | 20 × 20 | Orthogonal | Steel |
| Regulator 7 | 1.375 | 60 × 60 | Orthogonal | Steel |
| Regulator 8 | 1.375 | 36 × 36 | Orthogonal | Nylon |
| Regulator 9 | 1.63 | Large Mesh | Helical | Polyethylene |
| Control (no retainer) | NA | NA | NA | NA |

Figure 3A:
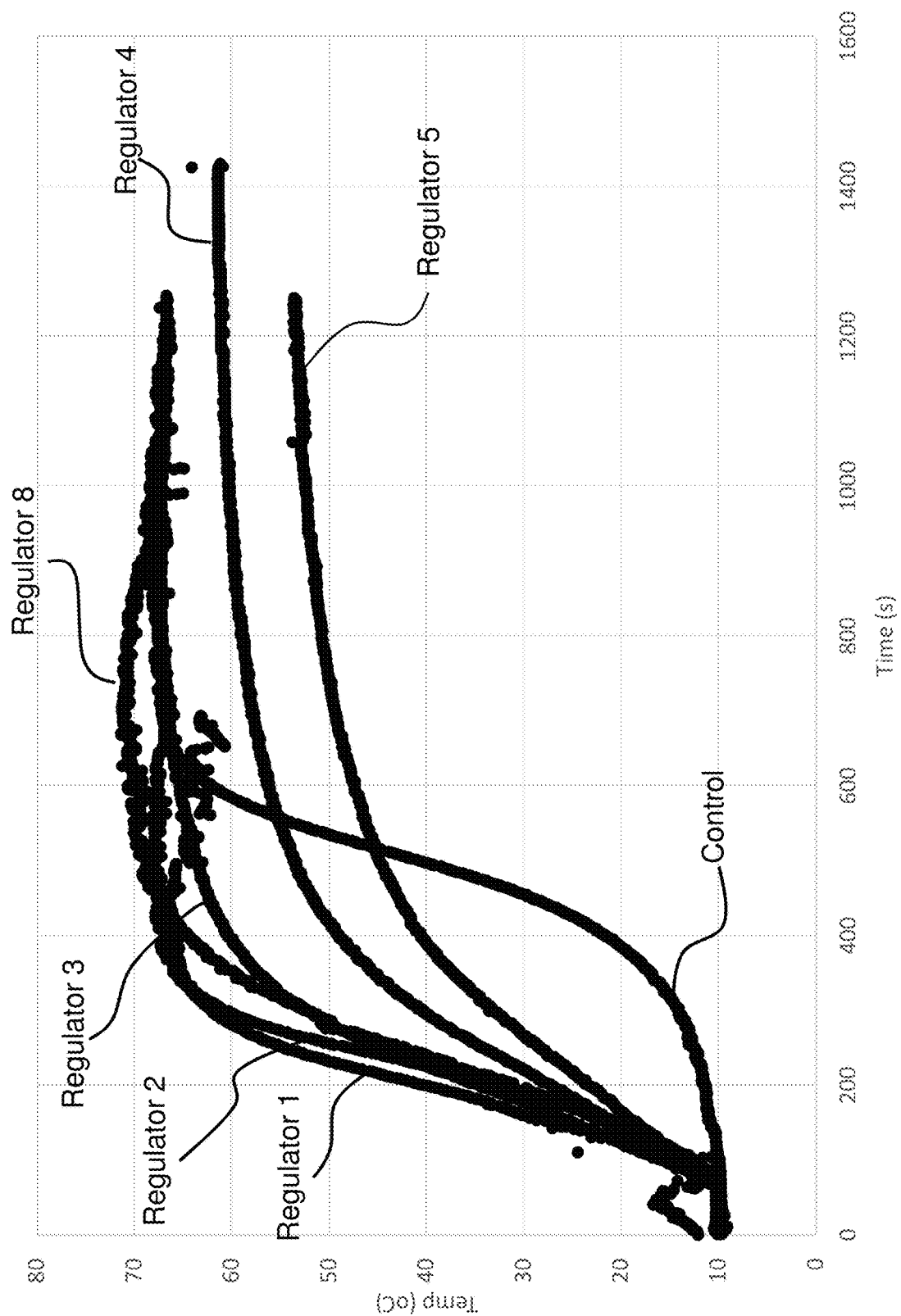
FIG. 3A is a graph of temperature as a function of time comparing the effect of changing diameter of the retainer of FIG. 1C at nominally constant mesh size.

FIG. 3A is a graph of temperature as a function of time for Regulator 1, Regulator 2, Regulator 3, Regulator 4, Regulator 5, Regulator 8, and the Control. Thus, among other things, the data in FIG. 3A provide an indication of the impact of diametric dimension on the reaction rate (as indicated by a rate of temperature rise in the figure). In particular, it shall be appreciated from FIG. 3A that regulators with retainers having smaller diametric dimensions of the elongate shape react more rapidly and, conversely, larger diametric dimensions react more slowly. From this, it shall be understood that the diametric dimension of the secondary volume generally has an upper limit, as larger diametric dimensions increase the risk of choking the reaction or splitting the retainer open as a result of pressure produced by an excess amount of reaction byproducts.

Figure 3B:
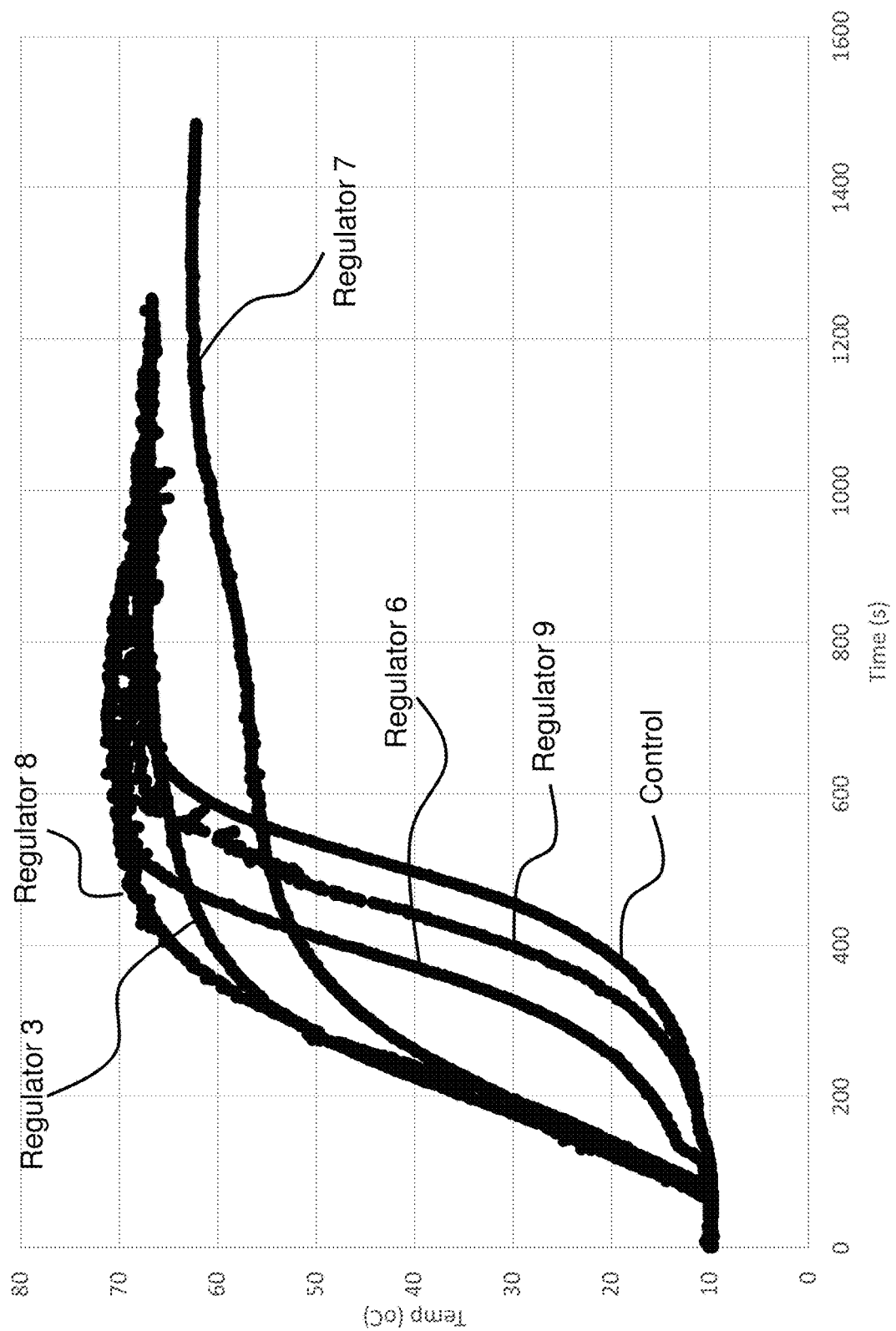
FIG. 3B is a graph of temperature as a function of time comparing the effect of changing mesh size of the retainer of FIG. 1C at nominally constant diameter.

FIG. 3B is a graph of temperature as a function of time for Regulator 3, Regulator 6, Regulator 7, Regulator 8, Regulator 9, and the Control. Accordingly, based on the data in FIG. 3B, it appears that the smallest mesh size (60×60) corresponding to Regulator 7 did not react fully. Without wishing to be bound by theory, it is believed that this mesh size may have been too small to let reaction by products out of the secondary volume while allowing water into the secondary volume such that the reaction could proceed to completion. That is, it is believed that the aluminum hydroxide byproduct may have at least partially quenched the reaction of water and activated aluminum in Regulator 7. Further without wishing to be bound by theory, it is believed that the large mesh size (20×20) associated with Regulator 6 allows the reaction byproduct out of the secondary volume too quickly such that the activated aluminum in the secondary volume is exposed to water too quickly, thus accounting for the slow temperature rise.

Referring now to FIGS. 3A and 3B together, it shall be appreciated that these test results collectively provide useful guidance with respect to the impact of various features of the retainer and, in doing so, provide useful information regarding the combination of retainer features useful for providing an appropriate balance between heat generation and cooling. For example, the experimental data suggest that a medium sized, mesh having more than about 20 openings per linear inch and less than about 60 openings per linear inch (e.g., about 40 openings per linear inch) provides an appropriate amount of mass transfer.

Additionally, or alternatively, the experimental data suggest that a practical upper bound of the diametric dimension of the elongate shape of the secondary volume is less than about 1.625 inches (e.g., about 1.375 inches). While a practical limit on the lower bound of the diametric dimension was observed, it shall be appreciated that this lower bound may be dictated by the quantity of hydrogen required for a particular application. Further, or instead, the experimental data suggest that the retainer may be formed of a polymer such as nylon or polyethylene, without a significant impact on performance of the retainer. It shall be appreciated that the use of one or more polymers may be particularly useful for cost-effective fabrication and further, or instead, may reduce the likelihood of potential damage to other components of the system in the event of a rupture of the retainer. Additionally, or alternatively, from the experimental data, it may be noted that the orthogonal mesh maintains diameter of the retainer, but the gap is important to reactivity. A helical mesh may expand to release the reaction byproduct and, thus, may be less sensitive to clogging as compared to the orthogonal mesh.

Significantly, among the regulators tested, the regulators had different axial dimensions of the secondary volume. However, there did not appear to be a relationship between the reaction rate and the axial lengths of the regulators. This appears to be empirical verification that the regulators of the present disclosure advantageously afford a two-dimensional boundary for mass and heat transfer. That is, under otherwise identical conditions, additional hydrogen may be generated by increasing the length of a given regulator. While this is a significant advantage with respect to spherical form factors, it shall be appreciated that there may nevertheless be practical limits on the upper and lower bounds of the axial dimension of the secondary volume. For example, it may be generally desirable to have a ratio of the axial dimension to the diametric dimension greater than about 3:1 such that ends of the regulator do not form a significant fraction of the overall length of the regulator. Further, or instead, it may be useful to have a ratio of the axial dimension to the diametric dimension less than about 100:1, such as may be useful for reducing the likelihood of inadvertent tearing (e.g., during transport and/or storage) along the length of the regulator.

Having described certain aspects of regulators for controlling production of hydrogen from water-reactive aluminum, attention is directed now to other approaches that may be additionally or alternatively used to space activated aluminum within a reaction vessel to facilitate rapid production of large quantities of hydrogen. For the sake of clear and efficient description, elements having numbers having the same last two digits shall be understood to be analogous to or interchangeable with one another, unless otherwise explicitly made clear from the context, and, therefore, are not described separately from one another, except to not differences or to emphasize certain features.

Figure 4:
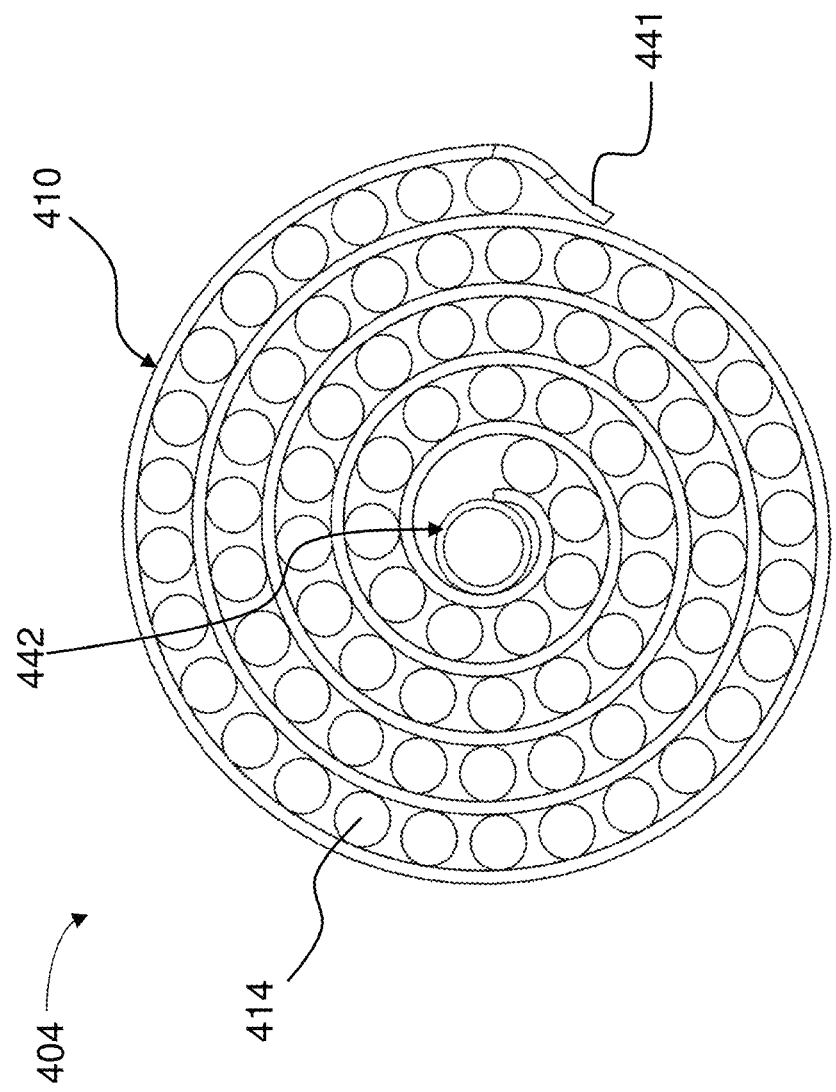
FIG. 4 is an end cross-sectional view of a retainer including layers of discrete objects including activated aluminum, with a layer of material of the retainer extending between each adjacent layer of the discrete objects.

Referring now to FIG. 4, a regulator 404 may include a retainer 410 and a plurality of discrete objects 414, with each one of the plurality of discrete objects 414 including aluminum in an activated form reactable with water to produce hydrogen. The plurality of discrete objects 414 may be encased in the retainer 410 in layers with material of the retainer 410 extending between adjacent layers of the plurality of discrete objects 414. For example, the plurality of discrete objects 414 may be rolled in the retainer 410, and a free end 441 of the retainer 410 may be secured to another portion of the retainer 410 to facilitate holding the plurality of discrete objects 414 in place.

In certain implementations, the regulator 404 may include a tube 442 extending axially along the retainer 410. For example, the tube 442 may be permeable such that water may be delivered to the plurality of discrete objects 414 along an inner portion of the retainer 410 via the tube 442. Additionally, or alternatively, the retainer 410 may be permeable between the adjacent layers to facilitate delivering water to the various different layers.

Figure 5:
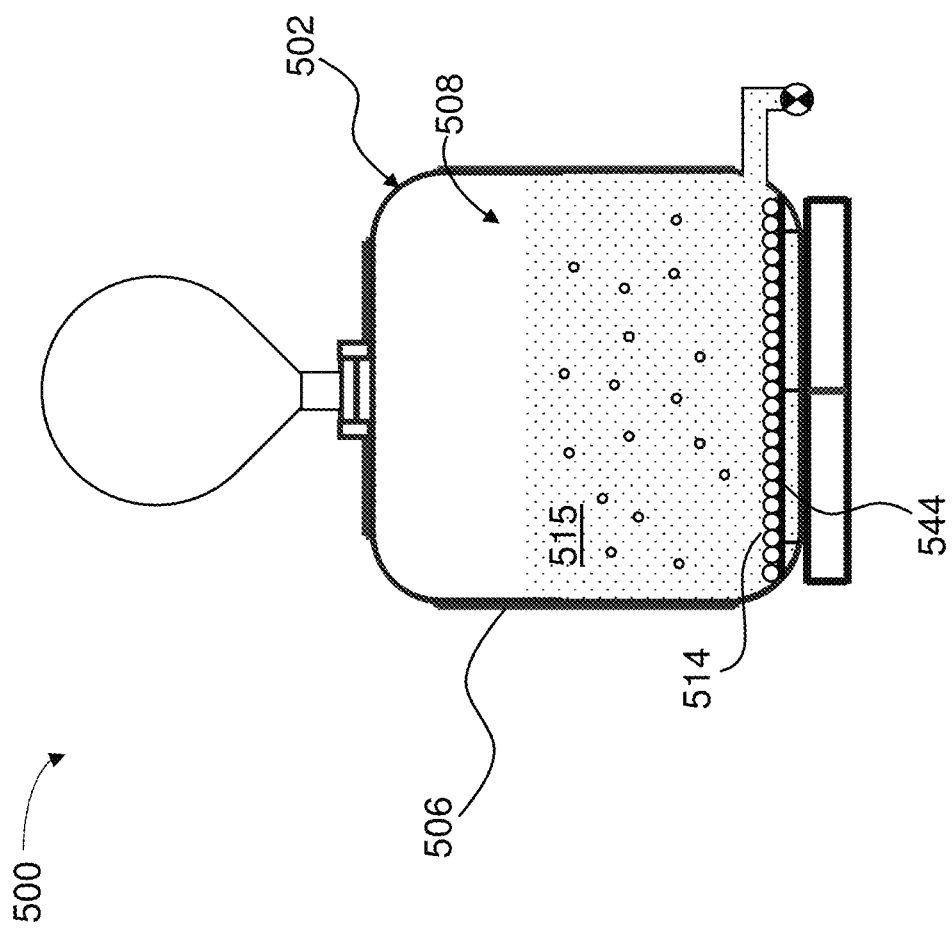
FIG. 5 is a schematic representation of a system for controlling hydrogen production from water-reactive aluminum, the system including a reaction vessel and a grate disposed in a primary volume defined by the reaction vessel, with the reaction vessel shown in cross-section.

Referring now to FIG. 5, a system 500 may include a reaction vessel 502 and a grate 544. The reaction vessel 502 may define a primary volume 508, and the grate 544 may be disposed in the primary volume 508 to support a plurality of discrete objects 514. Each one of the plurality of discrete objects 514 may include activated aluminum. As water 515 in the primary volume 508 reacts with the activated aluminum of the plurality of discrete objects 514, the grate 544 may support the plurality of discrete objects 514 away from walls 506 of the reaction vessel 502 to reduce the likelihood that heat from the reaction may damage the walls 506. For example, the grate 544 may be formed of a polymer having a lower thermal conductivity. Additionally, or alternatively the grate 544 may be shaped to hold the plurality of discrete objects 514 in a predetermined orientation relative to one another to promote heat generation in the initial stages of reaction. Further, or instead, the grate 544 may be porous such that reaction byproducts may fall from the grate 544 to facilitate continually exposing activated aluminum of the plurality of discrete objects 514 to water as the reaction progresses.

Figure 6:
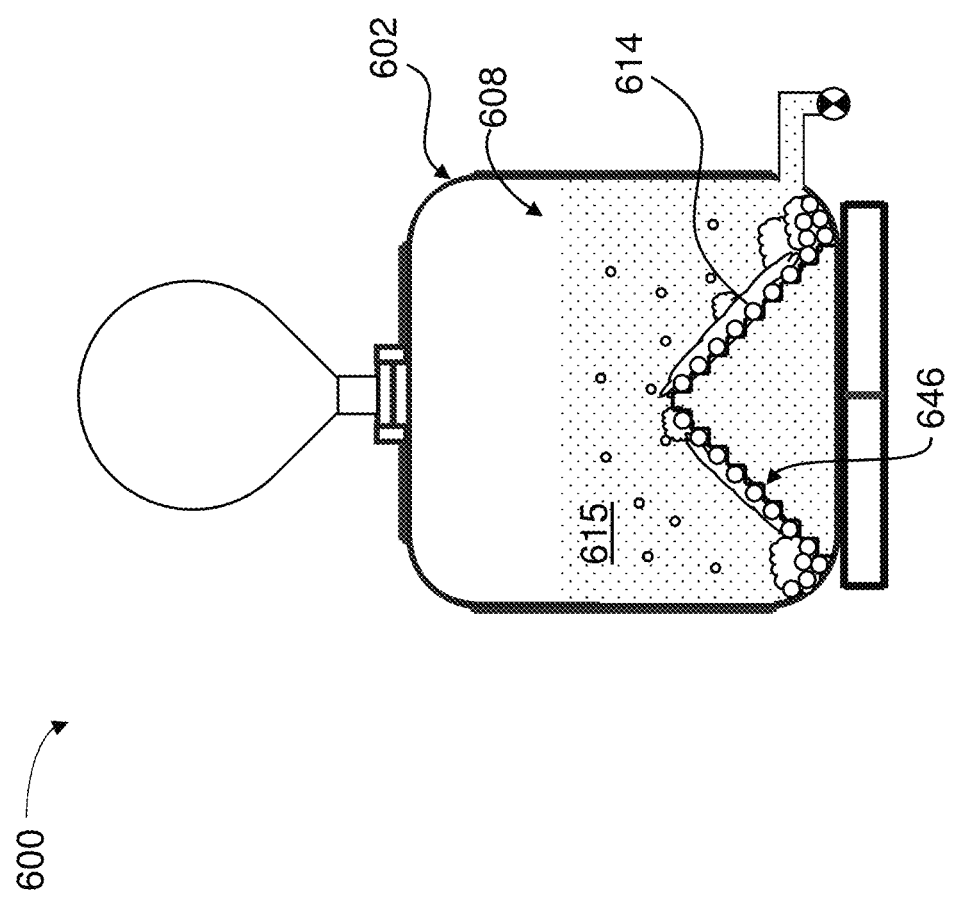
FIG. 6 is a schematic representation of a system including a reaction vessel and tiered platform disposed in a primary volume defined by the reaction vessel, the reaction vessel shown in cross-section.

Referring now to FIG. 6, a system 600 may include a reaction vessel 602 and a tiered platform 646. The reaction vessel 602 may define a primary volume 608. The tiered platform 646 may be disposed in the primary volume 608. A plurality of discrete objects 614 may be supported on the tiered platform 646 such that activated aluminum in each one of the plurality of discrete objects 614 may react with water 615 in the primary volume 608. More specifically, the plurality of discrete objects 614 may be dropped into the primary volume 608, and the shape of the tiered platform 646 may facilitate dispersing the plurality of discrete objects 614 in an orientation that is unlikely to result in uneven reaction and/or overheating. For example, the tiered platform 646 may be in the shape of a pyramid, and the plurality of discrete objects 614 may settle along recesses on the pyramid to create a spatial distribution of the plurality of discrete objects 614.

Figure 7:
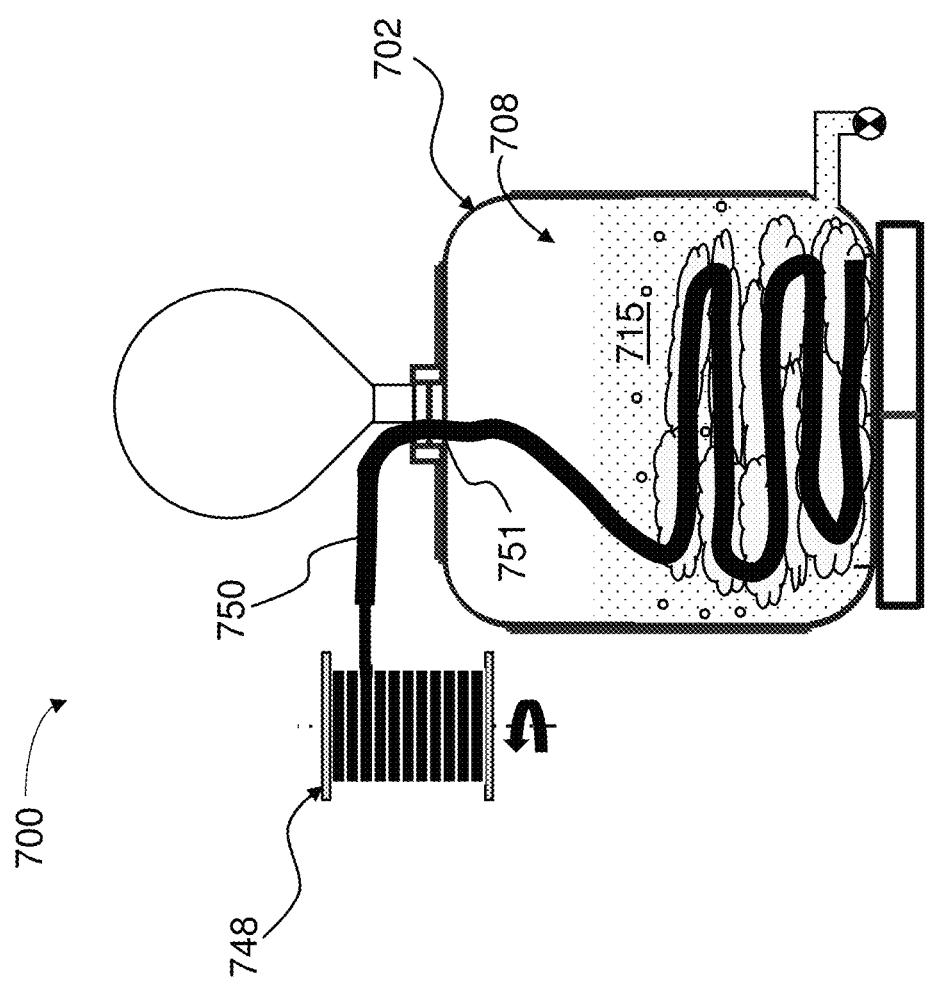
FIG. 7 is a schematic representation of a system including a reaction vessel and a spool of activated aluminum, the reaction vessel shown in cross-section.

Referring now to FIG. 7, a system 700 may include a reaction vessel 702 and a spool 748 of wire 750 of activated aluminum. The reaction vessel 702 may define a primary volume 708, and the wire 750 may be moved from the spool 748 into the primary volume 708 via a sliding seal 751. As the wire 750 moves into the primary volume 708, the activated aluminum of the wire 750 may react with water 715 in the primary volume 708 to produce hydrogen. For example, the wire 750 may be fed into the primary volume 708 to form a low-density tangled mass that may be unlikely to have hotspots as it reacts with the water 715 in the primary volume 708.

The wire 750 may be any one or more of various different types of continuous material including activated aluminum. Thus, in certain implementations, the wire 750 may be a solid and continuous material. Additionally, or alternatively, the wire 750 may include a plurality of any one or more of the various different regulators coupled to one another to form a spoolable material that may be continuously fed into the reaction vessel 702. More generally, the continuous nature of the delivery of the wire 750 into the primary volume 708 may facilitate producing a large amount of hydrogen with less down-time, as compared to batch processing.

Having described various different types of reaction vessels, it shall be appreciated that any one or more of the various different reaction vessels described herein may be used together. For example, multiple instances of a given reaction vessel may be used together. Additionally, or alternatively, different types of reaction vessels may be used as part of a system to produce hydrogen.

Figure 8:
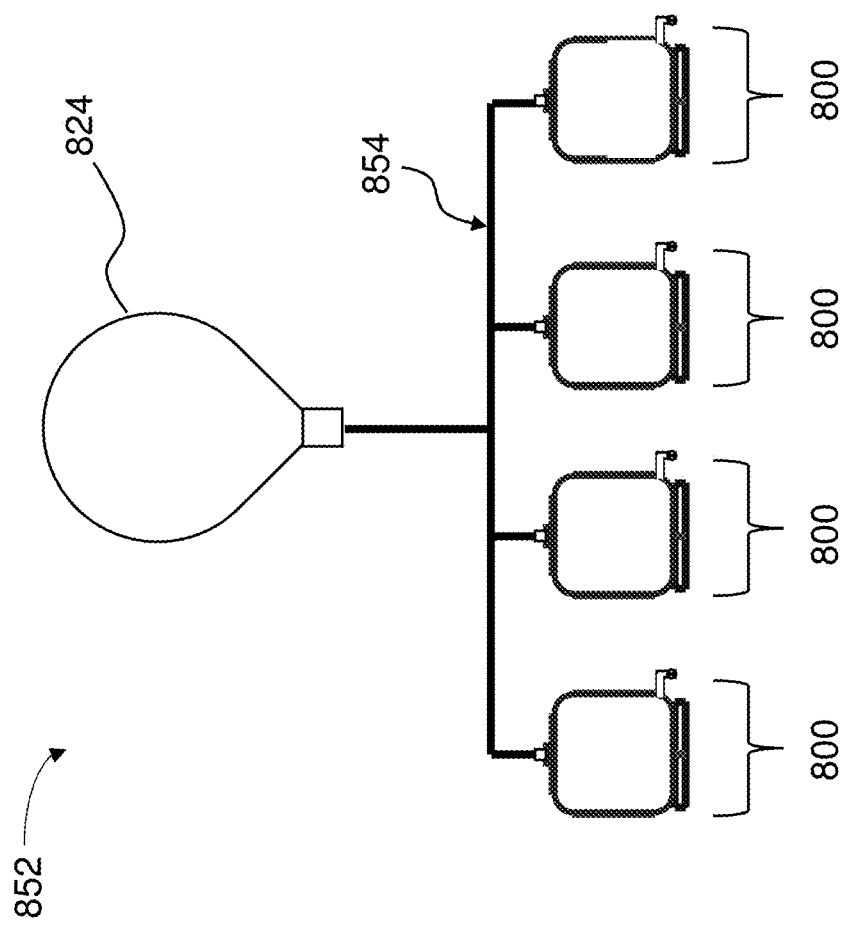
FIG. 8 is a schematic representation of a system including a plurality of reaction vessels coupled in fluid communication with a balloon via a manifold.

Referring now to FIG. 8, a plant 852 may include a plurality of systems 800 coupled to one another via a manifold 854 extending between the plurality of systems 800 and a balloon 824. In use, one or more of the plurality of systems 800 may direct hydrogen to the balloon 824 at any given time. Thus, for example, the plurality of systems 800 may be operable at the same time to facilitate filling the balloon 824, as may be useful in instances in which the balloon 824 is large.

While systems have been described as including reactor vessels that receive activated aluminum that may move, at least to some extent, within a primary volume, it shall be appreciated that discrete objects containing activated aluminum may be suspended in water in a primary volume in certain implementations.

Figure 9:
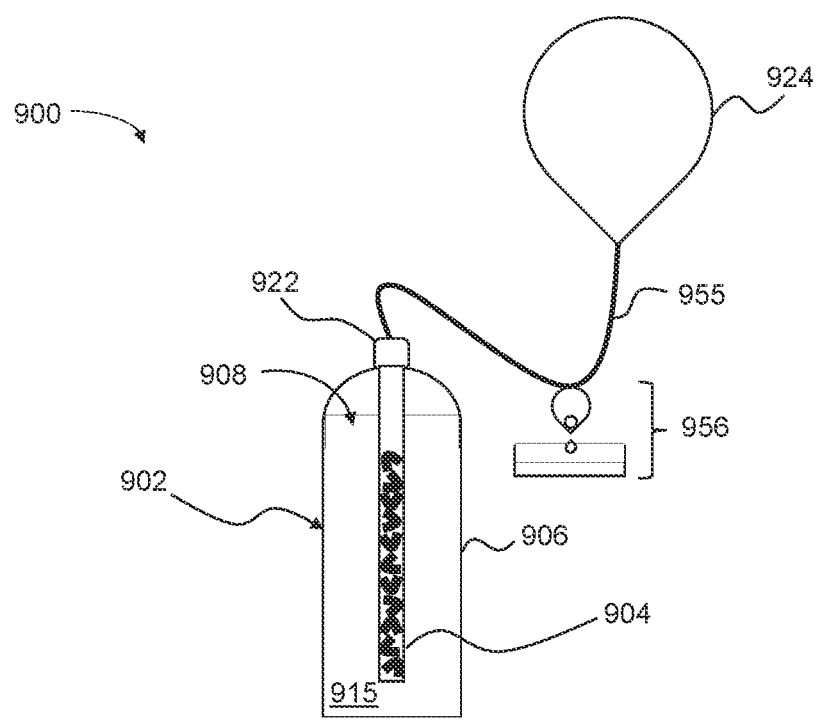
FIG. 9 is a schematic representation of a system including a retainer coupled to an outlet of the reaction vessel, with the reaction vessel and the retainer shown in cross-section.

For example, referring now to FIG. 9, a system 900 may include a reaction vessel 902 and a regulator 904. The reaction vessel 902 may define a primary volume 908, and the regulator 904 may be supported in the primary volume away from walls 906 of the primary volume 908. For example, the regulator 904 may be coupled to a valve assembly 922 at an opening of the reaction vessel 902 such that the regulator 904 is suspended in water 915 in the primary volume 908 at a position away from the walls 906. The regulator 904 (and the activated aluminum therein) in the primary volume 908 at this position may facilitate removing the regulator 904 without the use of a cord or other mechanism. In certain instances, steam may be released with hydrogen along a conduit 955 extending from the valve assembly 922 to a balloon 924. Steam is also a lifting gas but will eventually condense. Thus, in certain instances, the system 900 may include a water trap 956 positioned along the conduit 955 to collect condensation as the steam moving along the conduit cools.

Steam that enters the balloon 924 with the hydrogen will eventually condense. Such condensation may need to be released. For example, the balloon 924 may include a check valve (e.g., the check valve 130 in FIG. 1B, and the steam condensing in the balloon 924 may float a ball of the check valve to release water from the balloon 924 while retaining hydrogen in the balloon.

Having described various aspects of self-regulating control of hydrogen production from water-reactive aluminum, attention is turned now to certain aspects of active control of reacting activated aluminum with water to form hydrogen.

Figure 10:
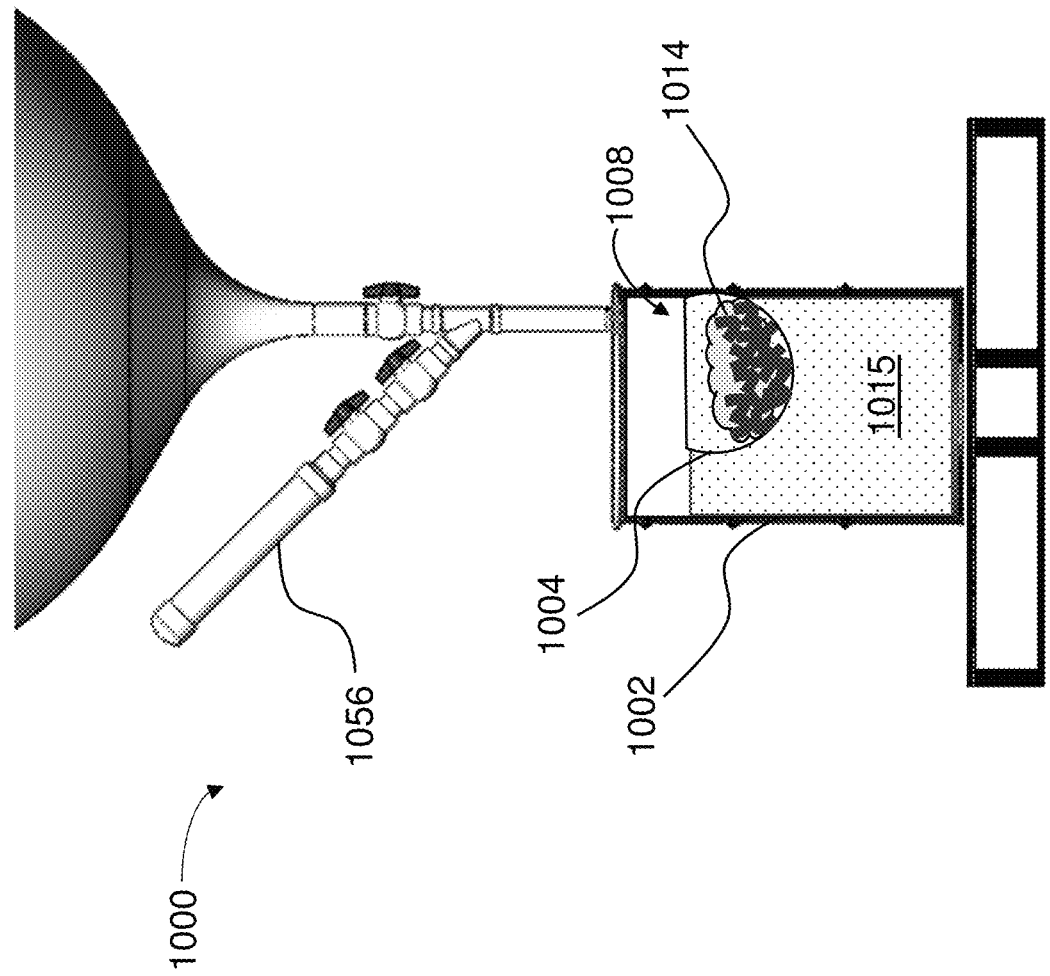
FIG. 10 is a schematic representation of a system including a retainer supported in a primary volume defined by a reaction vessel at a position to receive activated aluminum delivered through an outlet of the reaction vessel, the reaction vessel and the retainer shown in cross-section.

Referring now to FIG. 10, a system 1000 may include a reaction vessel 1002 and a regulator 1004. The reaction vessel 1002 may define a primary volume 1008, and the regulator 1004 may be disposed in the primary volume 1008, where a plurality of discrete objects 1014 may react with water 1015 to produce hydrogen. To facilitate controlling a local ratio of water-to-activated aluminum in the regulator 1004, the system 1000 may include a cannister 1056 containing additional instances of the plurality of discrete objects 1014 such that the cannister 1056 may be actuated (e.g., through actuation of one or more valves) to direct additional amounts of the plurality of discrete objects 1014 into the regulator 1004. Such control over delivery of the plurality of discrete objects 1014 into the regulator 1004 may, among other advantages, facilitate control over the local ratio of water-to-activated aluminum in the regulator 1004. For example, the cannister 1056 may deliver the plurality of discrete objects 1014 at a rate that varies as the reaction progresses. Thus, as compared to implementations, relying on a fixed ratio of water-to-activated aluminum, the cannister 1056 may facilitate achieving real-time or near real-time adjustments based on feedback, such as temperature.

Figure 11:
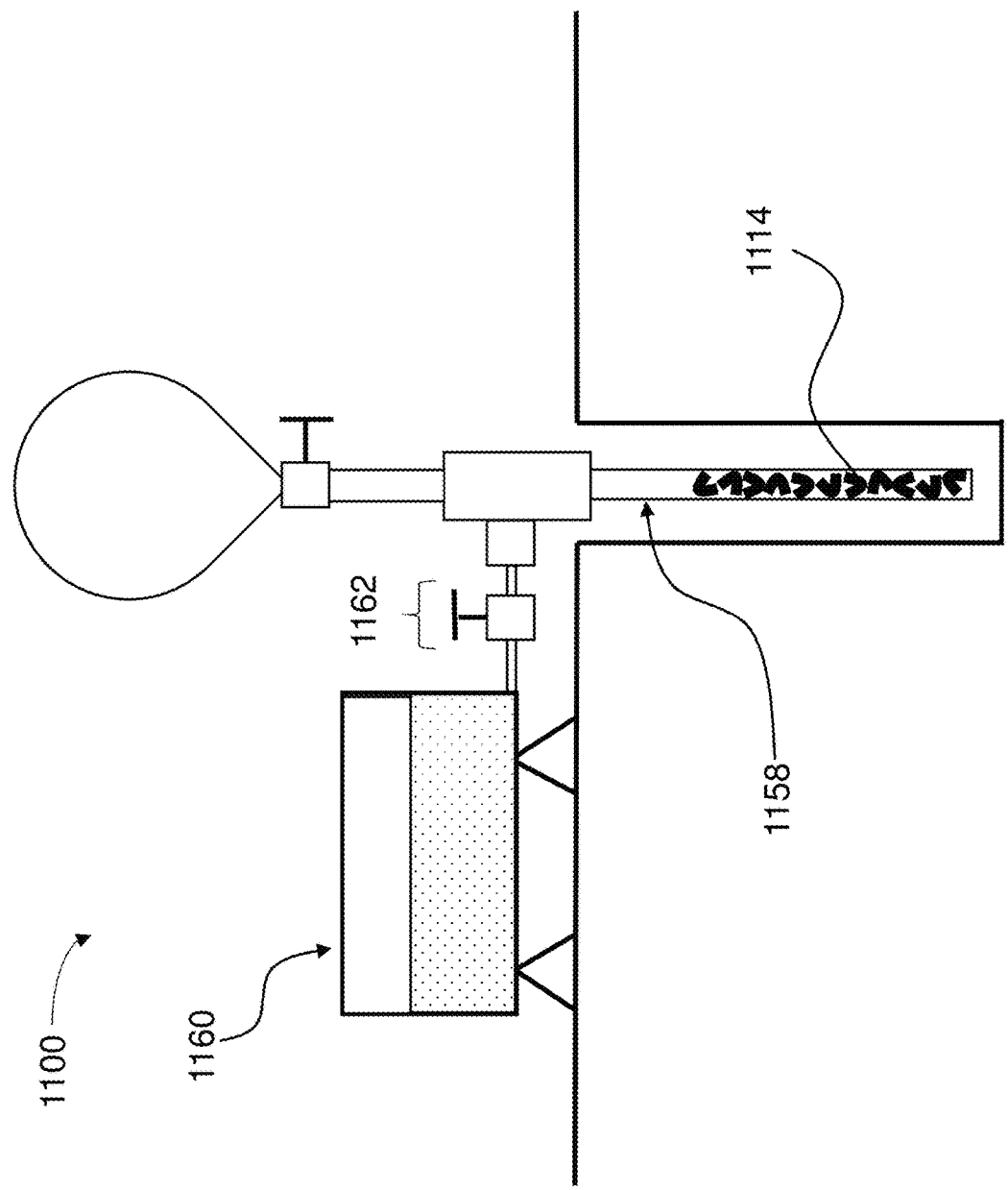
FIG. 11 is a schematic representation of a system including a retainer and a reservoir, with water from the reservoir movable into the retainer to react with activated aluminum fuel.

Referring now to FIG. 11, a system 1100 may include a tube 1158 containing a plurality of discrete objects 1114, with each one of the plurality of discrete objects 1114 including aluminum in an activated form reactable with water to produce hydrogen. Toward this end, the system 1100 may include a reservoir 1160 controllable in fluid communication with the plurality of discrete objects 1114 disposed in the tube 1158. For example, the system 1100 may include a control valve assembly 1162 operable to control the flow of water from the reservoir 1160 onto the plurality of discrete objects 1114 to control progress of the reaction of activated aluminum with water in the tube 1158 to produce hydrogen.

In certain implementations, the tube 1158 may be positioned in the ground, which has advantages with respect to safety and may facilitate flowing water from the reservoir 1160 into the tube 1158 using gravity. Water delivered to the tube 1158 may be consumed faster than it is fed into the tube 1158, resulting in the formation of some steam. The aluminum hydroxide formed is not absorptive. Accordingly, water falling onto the aluminum hydroxide may percolate through the aluminum hydroxide to reach the plurality of discrete objects 1114 in the tube 1158 may percolate The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for controlling hydrogen production from water-reactive aluminum, the system comprising:
   a reaction vessel including walls defining a primary volume;
   a regulator disposed in the primary volume, the regulator including a retainer defining a secondary volume having an elongate shape with an axial dimension greater than a diametric dimension, the secondary volume spaced from the walls of the reaction vessel, the secondary volume in thermal communication with the primary volume, the retainer having greater than about 20 openings per linear inch and less than about 60 openings per linear inch, and the secondary volume of the retainer having a diametric dimension greater than zero and less than about 1.625 inches;
   a balloon; and
   a valve assembly in fluid communication between the balloon and primary volume, the valve assembly including
      a quick-connect valve including a first portion coupled to the reaction vessel and a second portion coupled to the balloon, the quick-connect valve electrically actuatable to release the first portion from the second portion, and
      a check valve disposed in the balloon and operable to float to an open position under the force of condensation in the balloon to release at least a portion of the condensation from the balloon while retaining lifting gas within the balloon.

2. The system of claim 1, wherein the primary volume is greater than the secondary volume.

3. The system of claim 1, wherein the retainer is disposed on at least one of the walls of the reaction vessel, and the secondary volume is spaced from the at least one of the walls of the reaction vessel by material thickness of the retainer.

4. The system of claim 1, wherein the retainer is supported in the primary volume away from each of the walls defining the primary volume.

5. The system of claim 1, wherein the reaction vessel defines one or more openings, and the retainer is removable from the reaction vessel through the one or more openings.

6. The system of claim 1, further comprising a plurality of discrete objects in the secondary volume of the retainer, each one of the discrete objects including aluminum in an activated form reactable with water to produce hydrogen.

7. A method of controlling hydrogen production from water-reactive aluminum, the method comprising:
   immersing a retainer in water held in a primary volume, the retainer defining a secondary volume having an elongate shape and containing a plurality of discrete objects including an activated form of aluminum;

moving a portion of the water from the primary volume into the secondary volume via permeability of the retainer;

along the elongate shape of the secondary volume, reacting the portion of the water with the activated form of aluminum to form hydrogen and heat; and flowing heat and hydrogen from the secondary volume into a remaining portion of the water in the primary volume, wherein a mass ratio of the portion of the water to the activated form of aluminum in the secondary volume is 2:1 along at least a portion of the secondary volume at initiation of the reaction of the water and activated aluminum in the secondary volume.

8. A system for controlling hydrogen, the system comprising:

a reaction vessel defining a primary volume;

a regulator disposed in the primary volume and including a retainer defining a secondary volume in thermal communication with the primary volume, and the secondary volume having an elongate shape;

a balloon; and a valve assembly in fluid communication between the balloon and primary volume, the valve assembly including a quick-connect valve coupled to the reaction vessel and to the balloon, the quick-connect valve actuatable to release the balloon from the reaction vessel, and a check valve disposed in the balloon and operable to move to an open position in response to condensation in the balloon to release at least a portion of the condensation from the balloon while retaining lifting gas within the balloon.

9. The system of claim 8, wherein the retainer is water-permeable along the elongate shape.

10. The system of claim 9, wherein the retainer is expandable in response to pressure in the retainer, with expansion of the retainer increasing water-permeability of the retainer.

11. The system of claim 10, wherein the retainer is at least partially formed of one or more polymers.

12. The system of claim 8, wherein the retainer is at least partially formed of one or more metals.

13. The system of claim 12, wherein the one or more metals include aluminum, magnesium, or iron.

14. The system of claim 8, wherein, along the elongate shape, the retainer has a diametric dimension of greater than zero and less than about 1.625 inches.

15. The system of claim 8, further comprising a cord attached to the retainer.

16. The system of claim 8, wherein the quick-connect valve is electrically actuatable to release the balloon.

17. The system of claim 8, wherein the check valve is operable to move to the open position under buoyancy force of condensation in the balloon.

* * * * *